United States Patent [19]

Ebina et al.

[11] 4,310,376
[45] Jan. 12, 1982

[54] WELDING APPARATUS

[75] Inventors: Ryuzo Ebina, Chiba; Tsutomu Nakayama, Matsudo; Minoru Tanaka, Kawasaki, all of Japan

[73] Assignee: Mitsubishi Kasei Kogyo Kabushiki Kaisha, Tokyo, Japan

[21] Appl. No.: 121,037

[22] Filed: Feb. 13, 1980

[30] Foreign Application Priority Data

Feb. 20, 1979 [JP] Japan .................................. 54-18793

[51] Int. Cl.³ .......................... B29C 27/06; B30B 5/06
[52] U.S. Cl. ................... 156/499; 156/228; 156/304.2; 156/580; 156/581; 156/583.1
[58] Field of Search ............ 156/499, 539, 581, 583.1, 156/580, 69, 152, 228, 292, 304.2, 304.6

[56] References Cited

U.S. PATENT DOCUMENTS

| 697,425 | 4/1902 | Kempshall | 156/292 |
| 3,053,726 | 9/1962 | Larson et al. | 156/304.2 |
| 3,180,776 | 4/1965 | Hessel | 156/228 |
| 3,460,310 | 8/1969 | Adcock et al. | 156/69 |
| 3,933,571 | 1/1976 | Studen | 156/583.1 |
| 4,032,387 | 6/1977 | Sugiyama et al. | 156/580 |
| 4,092,205 | 5/1978 | Mieszczak | 156/499 |

*Primary Examiner*—Michael G. Wityshyn
*Attorney, Agent, or Firm*—Oblon, Fisher, Spivak, McClelland & Maier

[57] ABSTRACT

In a welding apparatus of the type including a pair of opposing press plates relatively movable toward and away each other and each supporting a molded article to be welded together, and a heating plate movable into and out of a space between separated molded articles for fusing confronting surfaces of the molded articles whereby the molded articles are welded together by applying pressure thereto by the press plates, there are provided mold frames on the press plates. The mold frames define an opening having substantially the same contour as the molded articles to be welded together but having a slightly smaller size than the molded article. The inner surface of the opening is provided with an outwardly inclined surface.

14 Claims, 28 Drawing Figures

WELDING APPARATUS

BACKGROUND OF THE INVENTION

1. Field of the Invention

This invention relates to welding apparatus, more particularly to welding apparatus suitable for welding together large size synthetic resin molded articles having relatively large areas to be welded together.

2. Description of the Prior Art

Preparation of a product by welding together a plurality of molded articles or pieces produced by injection or extruding machines, for example, has been old and various types of welding apparatus have been used depending upon the type of the products.

Generally, the welding apparatus of the type described above includes a holding mechanism for holding the molded articles to be welded together in opposing positions, a heating mechanism for fusing or melting the surfaces of the articles to be welded together and a press mechanism for causing the molded articles to abut each other with their welding surfaces fused.

When welding together molded articles with the apparatus of the type referred to above, particularly where the articles are of a large size and have narrow widths to be welded together, for example, where the ends of plate shaped members are to be welded together, due to the difference in the warpage or shrinkage the relative positions of the molded articles are often offset thus decreasing the mechanical strength of the welded portion.

SUMMARY OF THE INVENTION

Accordingly, it is an object of this invention to provide improved welding apparatus capable of obviating these difficulties.

According to this invention, there is provided a welding apparatus of the type including a pair of opposing press plates relatively movable toward and away from each other. Each press plate supports a molded article to be welded together. A heating plate movable into and out of a space between separated molded articles is provided for fusing confronting surfaces of the molded articles such that the molded articles are welded together by applying pressure thereto by the press plates. There are provided mold frames mounted on the press boards such that the mold frames define an opening having substantially the same contour as the molded articles to be welded together but having a slightly smaller size than the molded articles. The mold frame opening is provided with an outwardly inclined surface. A portion of the inclined surface is perpendicular to the surface of the press plate and the inclined surface may be circular or include a series of contiguous flat surfaces. The angle of inclination of the inclined surface makes an angle of 45° to 85° with respect to the surface of the press plate and the angle increases toward the lower surfaces of the mold frames.

BRIEF DESCRIPTION OF THE DRAWINGS

In the accompanying drawings:

FIGS. 7A, 7B and 7C are enlarged longitudinal sectional views showing a portion of the welding apparatus shown in FIGS. 6A through 6H in which FIG. 7A is a partial perspective view, and FIGS. 7B and 7C are longitudinal sectional views.

DETAILED DESCRIPTION OF THE PREFERRED EMBODIMENTS

Figure 1:
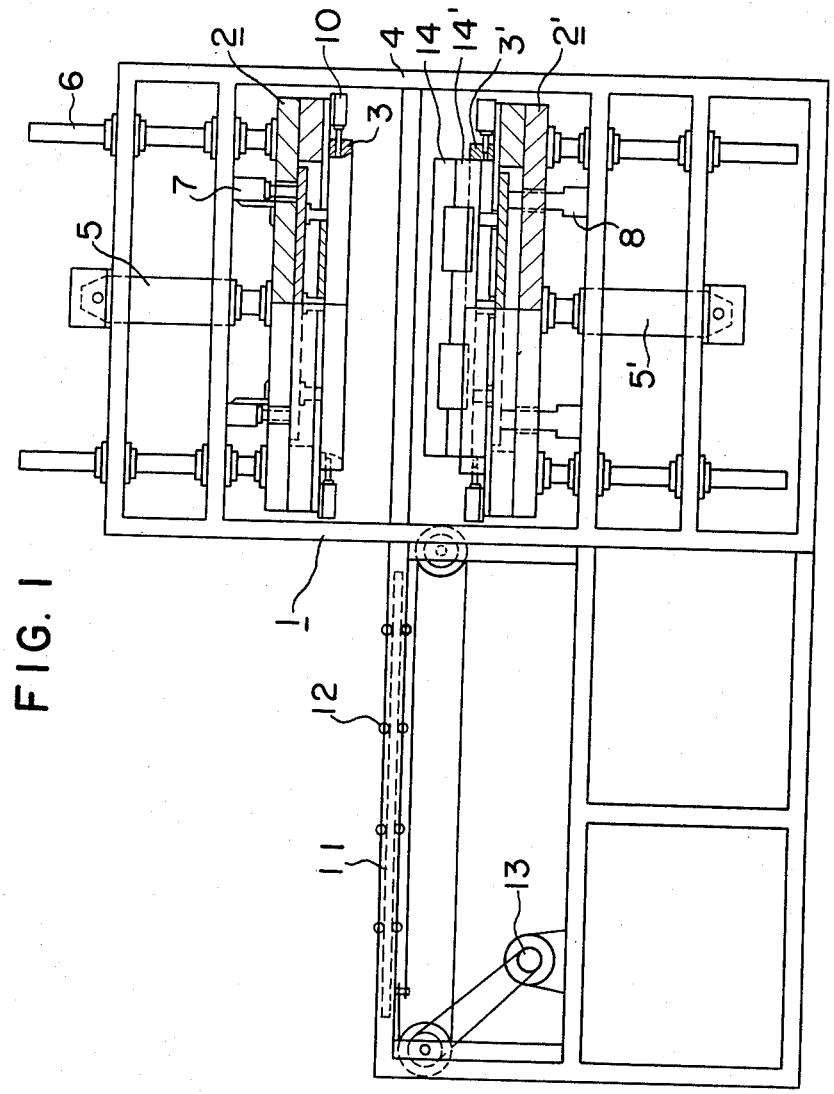
FIG. 1 is a side view, partly in section, showing one embodiment of the welding apparatus embodying the invention.

A preferred embodiment of the welding apparatus 1 of this invention as shown in FIG. 1 to FIG. 7A includes upper and lower press plates 2 and 2', mold frames 3 and 3' respectively mounted on the press plates, a framework 4 for supporting the upper and lower press plates and other component elements, pressurized oil or air operated press cylinders 5 and 5' with their upper and lower ends pivotally supported by the frame work 4 and adapted to move the press plates 2 and 2' toward and away in the vertical direction, guide rods 6 connected to the press plates and extending through the frame work 4, ejection piston-cylinder assemblies 7 for urging ejection pins 9 to separate molded articles 14 and 14' from the press plates 2 and 2', ejection rods 8 for operating the ejection pins 9, latch members 10 for securing the molded articles to the press plates 2 and 2', a heating plate 11 reciprocated along guide rollers 12 by an electric motor 13 to be brought into and out of a space between the press plates 2 and 2'. There are also provided projections 15 and 15' on the heating plate 11 for determining the weld or fusion allowance. The mold frames 3 and 3' are provided for opposing sides of the press plates 2 and 2', and depending upon the contour of the articles 14 and 14' to be welded together, have slightly smaller size but substantially the same inner contour as the outer contour of the articles to be welded together. The upper portion of the inner surfaces of the mold frames 3 and 3' slightly incline outwardly.

Figure 2:
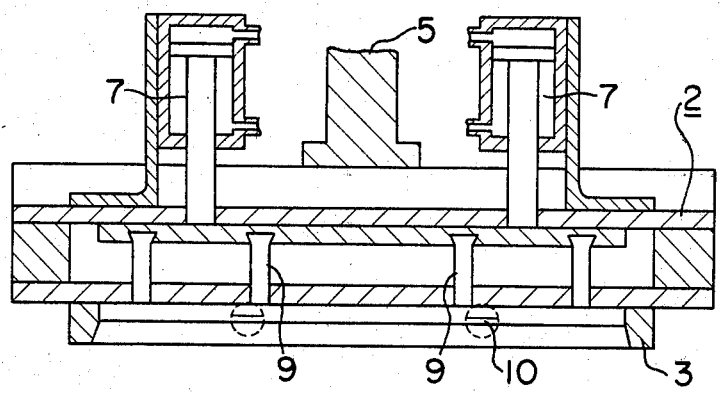
FIG. 2 is an enlarged longitudinal sectional view showing one example of a press plate utilized in the welding apparatus according to this invention.
Figure 3:
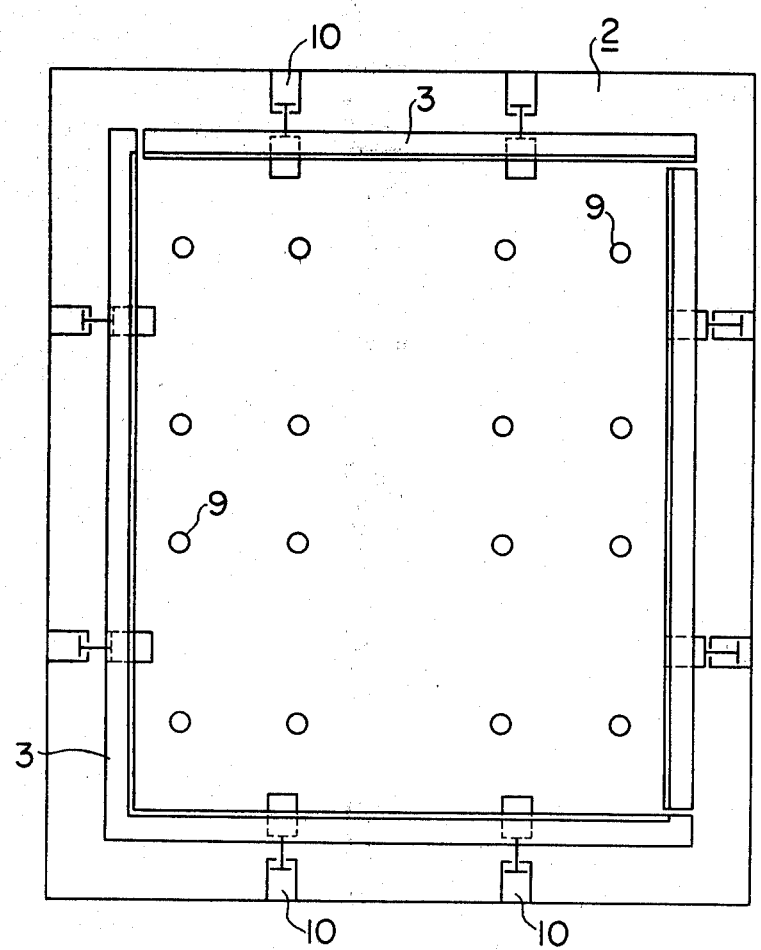
FIG. 3 is a plan view showing the press plate shown in FIG. 2.

As shown in FIGS. 2 and 3, although it is desirable to secure the mold frames 3 and 3' to the press plates 2 and 2', when the mold frames are provided along the four sides, it is advantageous to make adjustable at least two adjacent mold frames for the purpose of adjusting the inside contour.

Since the outer contours of the molded articles 14 and 14' are generally the same, the inner dimensions of the mold frames 3 and 3' are also adjusted to be the same. At this time, of course the mold frames 3 and 3' are positioned on the press plates 2 and 2' to confront the molded articles.

The detail of the construction of the mold frames 3 and 3' will now be described with reference to FIG. 4. More particularly, the mold frames 3' are mounted on the opposing sides of one press plate 2' and their inner surfaces are inclined outwardly which assures a smooth fit of the molded article 14' when it is pressed into the mold frames 3'. As above described, the inner contour of the opening defined by the mold frame 3' is made to be slightly smaller than the outer contour of the molded article 14', so that when pressed into the opening, the molded article 14' would be compressed to have the same size as that of the opening.

The angle of inclination ($\theta$, in FIG. 4) may be selected variously depending upon the size and the height, etc. of the molded articles to be welded, but it is advantageous to select angle $\theta$ in a range of 45°–85°, preferably 60°–80°.

Figure 4:
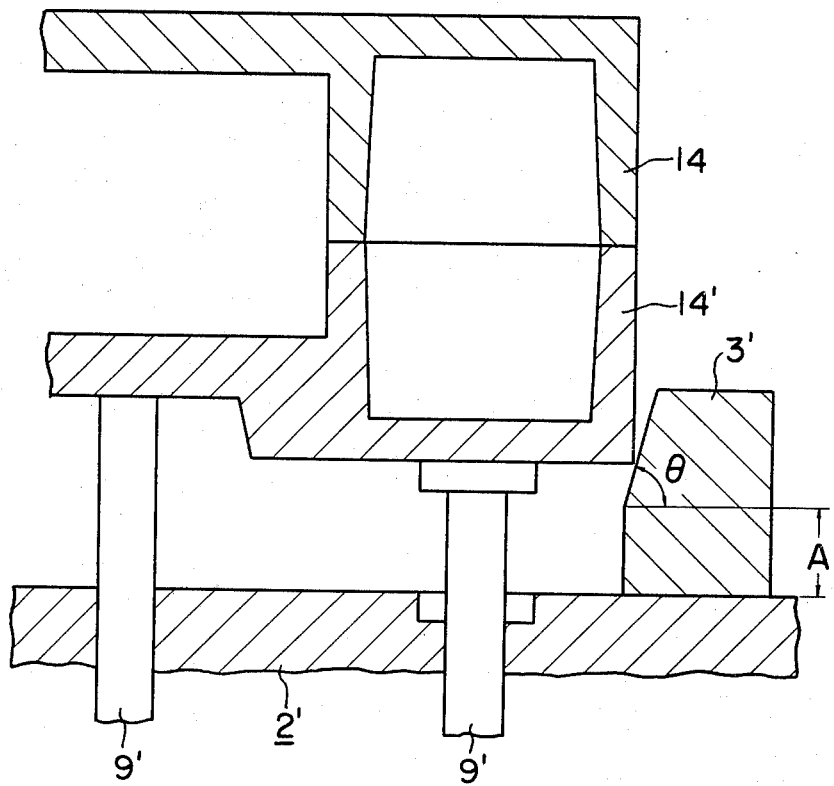
FIG. 4 is an enlarged longitudinal sectional view showing one example of a mold frame provided for the press plate.

Although the inclined surface may be provided along the entire inner side of the mold frame, the bottom portion of the inner side may be made vertical as shown in FIG. 4. The latter construction prevents the molded article from deforming outwardly or disengaging from the mold frame 3'. Although the length of the vertical wall may be suitably selected depending upon the construction and the size of the molded article to be welded it is advantageous to select the height of the vertical wall to be more than 3 mm, preferably more than 5 mm.

Figure 5A:
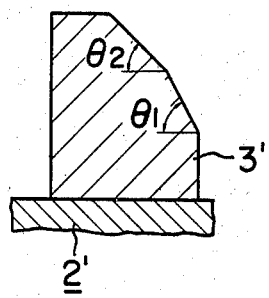
FIGS. 5A through 5G are partial sectional views showing modifications of the mold frame.
Figure 5B:
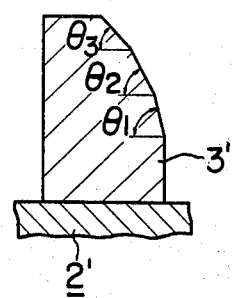

FIGS. 5A through 5G illustrate other examples of the mold frame 3' of this invention, in which FIGS. 5A and 5B show examples in which the inclined surface includes a plurality of flat planes which are contiguously connected together so that the inclination varies stepwisely, the angle of inclination increasing towards bottom. Thus, in FIG. 5A $\theta_1 > \theta_2$ and in FIG. 5B $\theta_1 > \theta_2 > \theta_3$.

Figure 5C:
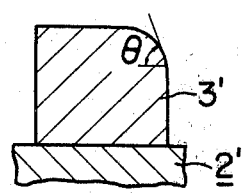
Figure 5D:
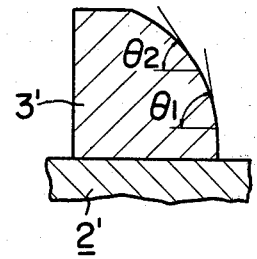

In the examples shown in FIGS. 5C and 5D the upper corner of the mold frame 3' is made circular. In these cases, the term angle means an angle between a tangent to the lower edge of the circular portion and the upper surface of the press plate. Thus, in the case shown in FIG. 5D, the angle $\theta$ is varied in the same manner as in FIGS. 5A and 5B.

In order to smoothly press the molded article 14' into the mold frame 3', it is advantageous to stepwisely increase the angle $\theta$ as shown in FIGS. 5A, 5B and 5D.

Figure 5E:
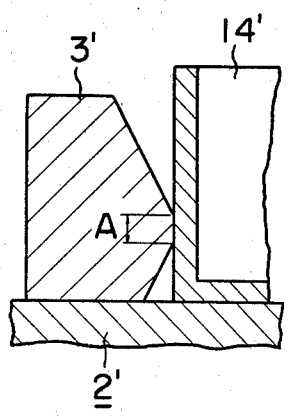
Figure 5F:
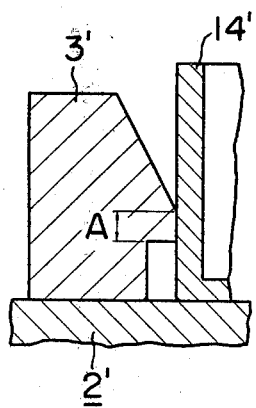

In the cases shown in FIGS. 5E and 5F, the lower vertical surface of the molded article is partially removed to form a triangular or rectangular space which is effective to prevent deflection of the molded article. In this case too, it is advantageous to make the height A of the vertical surface to be more than 3 mm, preferably more than 5 mm.

Figure 5G:
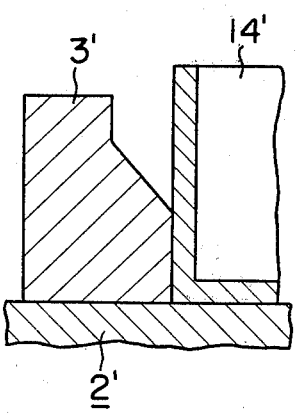

With the construction shown in FIG. 5F, in certain cases the molded article is disposed on the inclined surfaces with the bottom of the molded article inclined with respect to the horizontal. When the molded article is force fitted into the opening of the mold frames, under this state, the resulting welded article would be deformed. For the purpose of inserting the molded article in the vertical direction the upper portion of the inclined surface is made vertical as shown in FIG. 5G.

One example of the steps of welding together synthetic resin molded articles by utilizing the welding apparatus of this invention will now be described with reference to FIGS. 6A–6H. The molded articles 14 and 14' depicted in the drawings include a synthetic resin pallet divided into upper and lower halves, each having a width of about 1 m, a length of about 1 m and a thickness of about 7 cm.

Figure 6A:
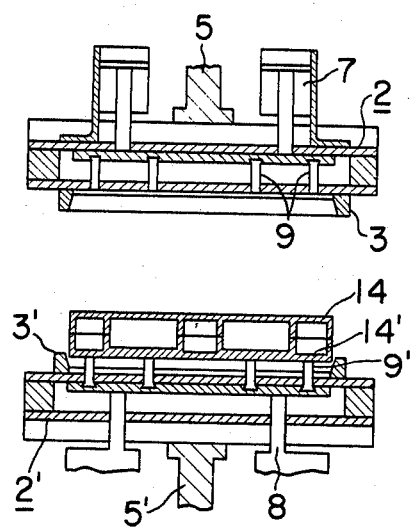
FIGS. 6A through 6H show sectional views showing consecutive steps of welding together molded articles with the welding apparatus of this invention.

At a step shown in FIG. 6A, molded articles 14 and 14' are mounted on the lower press plate 2' in vertical alignment while the upper press plate 2 is raised.

Figure 6B:
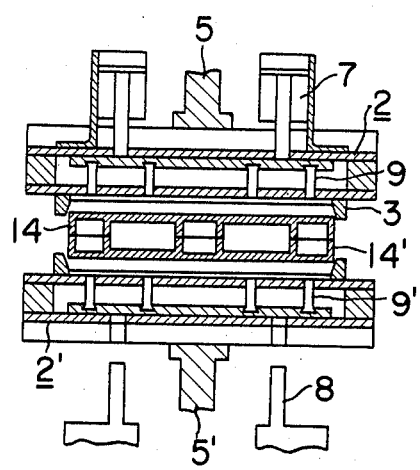

At a step shown in FIG. 6B, press cylinders 5 and 5' are actuated to move the press plates 2 and 2' toward each other. At this time ejecting pins 9 and 9' are held in their retracted positions.

Figure 6C:
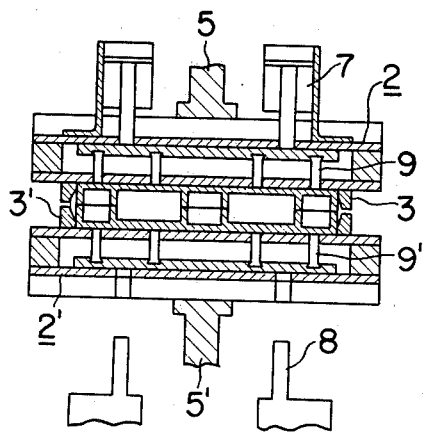

At a step shown in FIG. 6C, the spacing between the press plates 2 and 2' is reduced further, so as to press fit the molded articles 14 and 14' into the mold frames 3 and 3', thus compressing the molded articles and positioning them at predetermined positions. For this reason, even when the molded articles have slightly different sizes due to the difference in the shrinkage or flexure, they will have substantially the same size when they are force fitted.

With the welding apparatus of this invention, although it is possible to compress by more than 10 mm molded articles each having a size of 1000 mm × 1000 mm, if the degree of compression were too large stress would remain in the molded articles after welding. Actually, in the case of the molded articles of 1000 mm × 1000 mm, the deviation of the dimensions actually measured is at most ±3 mm. In other words the actual dimension ranges between 997 and 1003 mm so that in the actual compression, it is sufficient to compress about 8 mm from the maximum dimension, a little larger than the deviation.

For the reason described above, the inside contour of the mold frames 3 and 3' is generally adjusted to be the same as or slightly smaller than the minimum measured value of the molded articles to be welded. In such cases there is no fear of excessive compression of the molded articles with the result that any molded article can be satisfactorily fitted into the mold frames 3 and 3', whereby the molded articles can be held at correct positions during subsequent operations.

Although not shown in FIGS. 6A through 6H, for the purpose of securely fixing the molded articles 14 and 14' to the press plates 2 and 2', latch members 10 may be provided as shown in FIGS. 1–3. As diagrammatically shown in FIGS. 2 and 3, the latch members 10 may take a form of tongue shaped clamping plates reciprocated by oil pressure piston cylinder assemblies, mechanical or electrical actuators, or the like secured to the mold frames 3 and 3'. Thus, it is possible to clamp the molded articles with the clamping plates and the press plate.

Figure 6D:
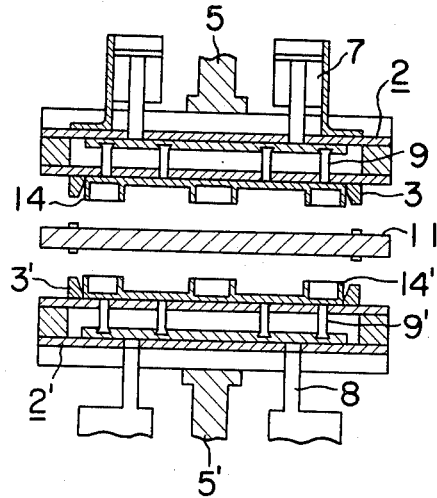

At a step shown in FIG. 6D, the press plates 2 and 2' are separated in the vertical direction together with the molded articles 14 and 14' secured thereto and a heating plate 11 heated by an electric heater or the like contained therein is advanced into a space between the separated molded articles.

Figure 6E:
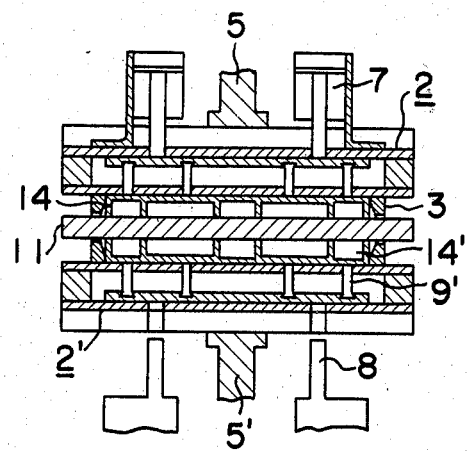

At a step shown in FIG. 6E, the press plates 2 and 2' are again moved toward each other to press the molded articles against the heating plate 11 to fuse their surfaces.

Figure 6F:
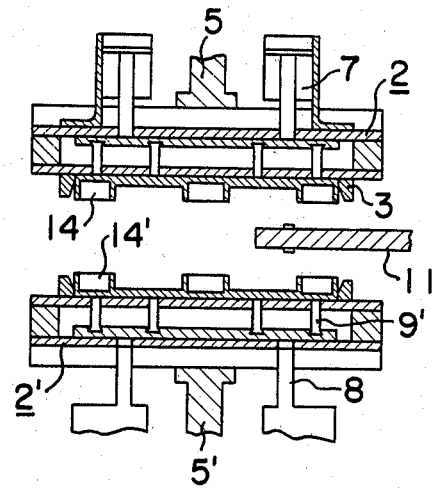
Figure 6G:
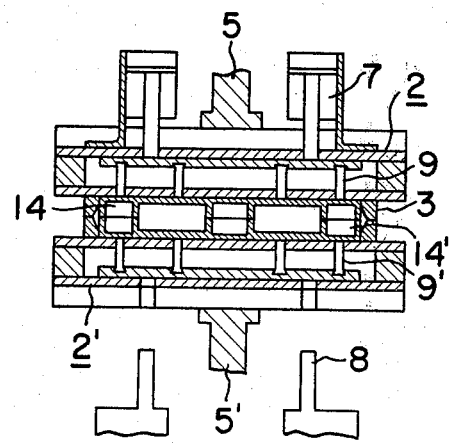

At a step shown in FIG. 6F, the press plates 2 and 2' are separated and the heating plate 11 is moved away. Then at a step shown in FIG. 6G, the press plates 2 and 2' are again moved toward each other, thereby welding together the molded articles 14 and 14' into a pallet.

This state is maintained until the welded portions solidify to an extent sufficient to hold the welded articles so as not to separate during subsequent handling.

Figure 6H:
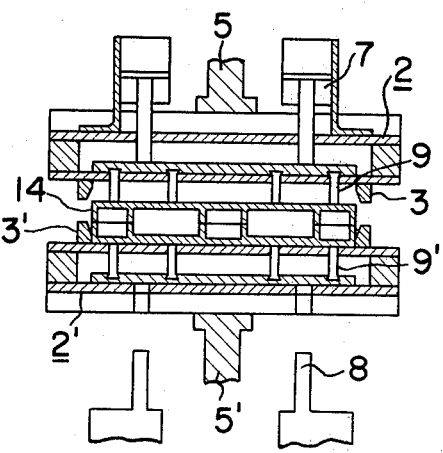

At a step shown in FIG. 6H, ejecting pins 9 associated with the upper press board 2 are projected by piston cylinder assemblies, for example, while at the same time only the press plate 2 is moved upwardly so as to disengage the welded articles 14 and 14', i.e. a pallet from the press plate 2. Then, the lower press plate 2' is moved downwardly. At this time, ejecting rods 8 cause the ejection pins 9' to project to separate the resulting pallet away from the lower press plate. This state is the same as that shown in FIG. 6A.

Although ejecting pins 9 and 9' are used for the purpose of preventing separation or displacement of the welded articles, the ejecting pins may be substituted by means for laterally moving the mold frames 3 and 3' for alleviating the compressive force acting upon the molded articles.

Figure 7A:
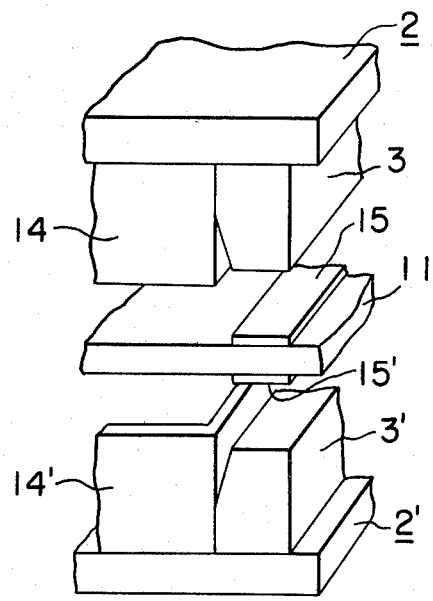
Figure 7B:
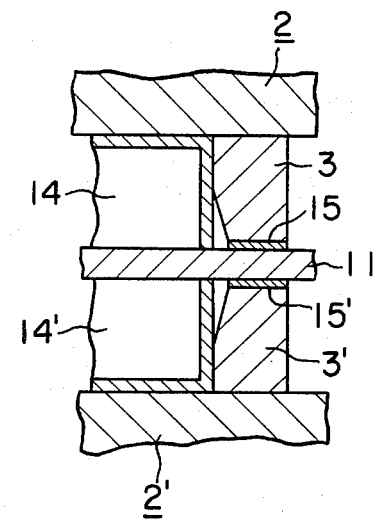
Figure 7C:
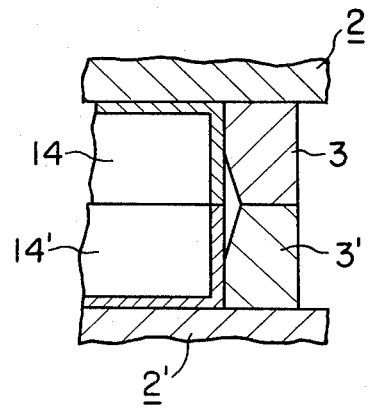
Figure 8A:
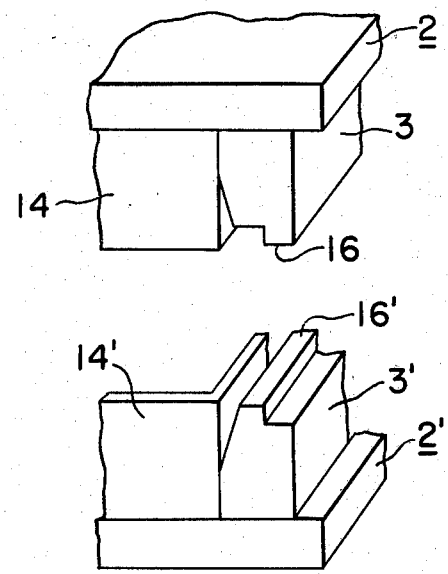
FIGS. 8A, 8B and 8C and FIGS. 9A, 9B and 9C show modified embodiments of this invention and respectively correspond to FIGS. 7A, 7B and 7C.
Figure 8B:
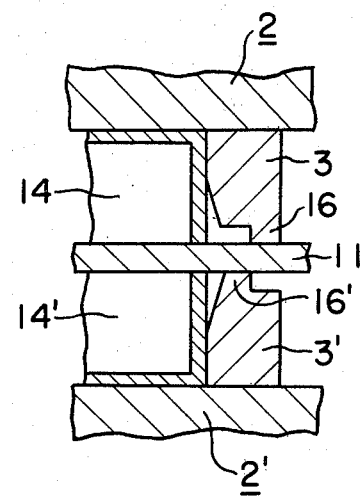
Figure 8C:
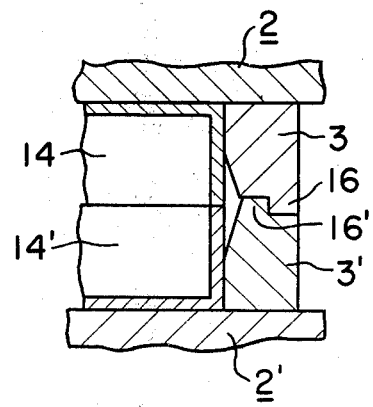
Figure 9A:
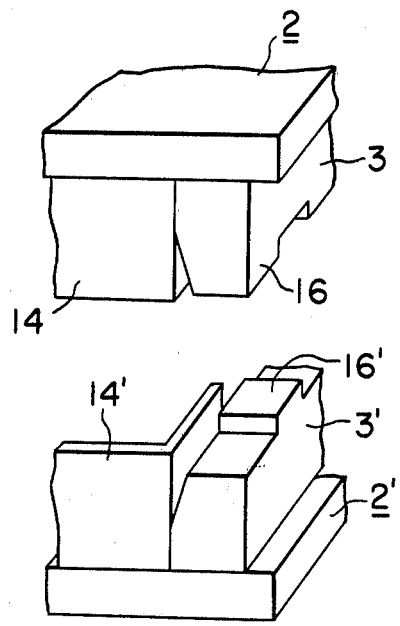
Figure 9B:
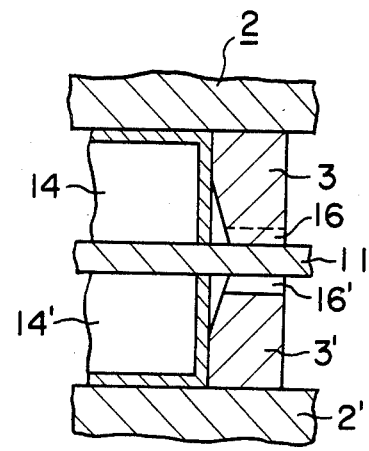
Figure 9C:
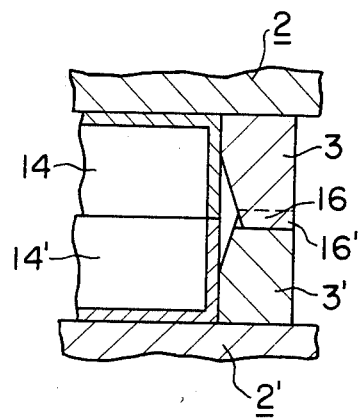

The states of the molded articles 14 and 14' at the time of fusion and after being welded together are shown in FIGS. 7A through 7C. FIG. 7A shows a state in which the heating plate 11 has been advanced between the molded articles 14 and 14'. As shown, projections 15 and 15' are provided for the heating plate 11 at positions corresponding to the mold frames 3 and 3', whereas FIG. 7B shows a state in which the molded articles 14 and 14' are pressed against the heating plate 11 by moving the press plates 2 and 2' toward each other. At this time, the molded articles 14 and 14' are compressed until the mold frames 3 and 3' provided for the press plates 2 and 2' and the projections 15 and 15' provided for the heating plate 11 come to engage thereby decreasing the thickness of the molded articles. Heating is continued until molten resin layers are formed on the confronting surfaces of the molded articles.

Then, the heating plate 11 is removed as above described and then the molded articles 14 and 14' are caused to abut each other thereby welding them together. By these steps, the thickness or height of the molded articles 14 and 14' decreases by the thickness of the projections 15 and 15', in other words the thickness of the projections 15 and 15' constitute weld allowance.

Such weld allowance can also be provided by modified embodiments of this invention shown in FIGS. 8A-8C and 9A-9C. In these modified embodiments interfitting projections 16 and 16' which operate in the same manner as the projections 15 and 15' shown in FIGS. 7A through 7C are utilized.

As above described, with the welding apparatus embodying the invention, regardless of the deviation in the actually measured dimensions of the molded articles to be welded together caused by shrinkage, etc. the dimensions are unified or standardized by urging the molded articles against the mold frames to prevent displacing the molded articles at the weld which lowers the strength of the weld. Moreover, the mold frames mounted on the press plates can adjust as desired the fusion or weld allowance.

What is claimed is:

1. A welding apparatus comprising:
   a pair of opposing press plates relatively movable toward and away from each other, each of said plates supporting a molded article to be welded together;
   a heating plate movable into and out of a space between said molded articles for fusing confronting surfaces of said molded articles so that said molded articles are welded together by applying pressure thereto by said press plates
   a plurality of mold frames mounted on said press plates, at least one of said mold frames having an outwardly inclined inner surface, said mold frames defining an opening having substantially the same contour as said molded articles to be welded together and having a slightly smaller size than said molded articles; and
   means supported by said press plates for separating said molded articles from said press plates.

2. The welding apparatus according to claim 1 said at least one of said mold frames further comprising an inner surface perpendicular to a surface of said press plates.

3. The welding apparatus according to claim 2 wherein said perpendicular portion comprises a wall portion of a recess formed in said at least one of said mold frames.

4. The welding apparatus according to claim 1 wherein said inclined surface makes an angle of 45° to 85° with respect to a surface of one of said press plates.

5. The welding apparatus according to claims 1, 2 or 4 wherein the angle of inclination of said inclined surface gradually increases from one surface to the other of each of said at least one of said mold frames.

6. The welding apparatus according to claims 1, 2 or 4 wherein said opening of said mold frames has substantially the same dimension as an actually measured minimum dimension of said molded articles.

7. The welding apparatus according to claim 1, said heating plate further comprising a projection extending therefrom for adjusting a weld allowance.

8. The welding apparatus according to claim 1 wherein said mold frames are disposed about respective sides of a rectangle so as to define an opening and wherein at least one adjacent pair of said mold frames is adjustable so as to adjust the size of said opening.

9. The welding apparatus according to claim 1 wherein said inclined surface comprises an arcuate surface formed at a top corner of one inner surface of said at least one mold frame, said arcuate surface being remote from said press plates and adapted to mate with said molded article.

10. The welding apparatus according to claim 1 wherein said inclined surface comprises a plurality of contiguous small inclined surfaces.

11. The welding apparatus according to claim 1 wherein opposing surfaces of said mold frames supported by said press plates comprise projections which interfit when said molded articles are pressed together.

12. The welding apparatus according to claim 1 further comprising latch members for latching said molded articles in position when said molded articles are force fitted into said opening defined by said mold frames.

13. The welding apparatus according to claims 1, 2 or 3 wherein said opening of said mold frames has a slightly smaller dimension than an actually measured minimum dimension of said molded articles.

14. The welding apparatus according to claim 1, wherein said means for separating said molded articles comprise a plurality of ejection pins.

* * * * *